US009577572B2

(12) United States Patent
Giles

(10) Patent No.: US 9,577,572 B2
(45) Date of Patent: Feb. 21, 2017

(54) SYSTEM OF SOLAR MODULES CONFIGURED FOR ATTACHMENT TO VERTICAL STRUCTURES

(71) Applicant: Harold Godfrey Giles, Ann Arbor, MI (US)

(72) Inventor: Harold Godfrey Giles, Ann Arbor, MI (US)

(73) Assignee: SOLARTONIC, LLC, Ann Arbor, MI (US)

(*) Notice: Subject to any disclaimer, the term of this patent is extended or adjusted under 35 U.S.C. 154(b) by 15 days.

(21) Appl. No.: 14/611,209

(22) Filed: Jan. 31, 2015

(65) Prior Publication Data
US 2015/0222226 A1 Aug. 6, 2015

Related U.S. Application Data

(60) Provisional application No. 61/934,164, filed on Jan. 31, 2014.

(51) Int. Cl.
*H02S 30/20* (2014.01)
*F24J 2/52* (2006.01)

(52) U.S. Cl.
CPC ............ *H02S 30/20* (2014.12); *F24J 2/523* (2013.01); *F24J 2/5241* (2013.01); *F24J 2/5262* (2013.01); *Y02B 10/20* (2013.01); *Y02E 10/47* (2013.01); *Y10T 29/49947* (2015.01)

(58) Field of Classification Search
CPC ......... H02S 20/30; F24J 2/5241; F24J 2/5247; F24J 2/523; F24J 2/5262; Y10T 29/49947; Y02B 10/20; Y02E 10/47
See application file for complete search history.

(56) References Cited

U.S. PATENT DOCUMENTS

| 4,265,422 A | 5/1981 | Van Leeuwen |
| 4,281,369 A | 7/1981 | Batte |
| 7,731,383 B2 | 6/2010 | Myer |
| 8,029,154 B2 | 10/2011 | Myer |
| 8,403,281 B2 | 3/2013 | Burtscher et al. |

(Continued)

FOREIGN PATENT DOCUMENTS

| CA | 2610217 A1 | 11/2006 |
| EP | 0849524 B1 | 2/2006 |

(Continued)

OTHER PUBLICATIONS

PCT-US1541147, International Search Report and Written Opinion, all pp. (1-5), mailing date is Nov. 5, 2015, search and opinion performed by Rospatent.

*Primary Examiner* — Devina Pillay
(74) *Attorney, Agent, or Firm* — Jelic Patent Services, LLC; Stanley E. Jelic

(57) ABSTRACT

A system of solar PV strip modules and method of use designed to integrate with vertical structures such as poles. The system and method use articulated semi-rigid solar PV strip modules and components with elastic characteristics to enable a high static-friction attachment to the structure. The static friction exceeds the force of gravity, enabling the solar PV strip modules to remain in place upon the vertical structure. The PV strip modules can have a rectangular shape or any other shape that enables customized or variable modular assembly and attachment to the structure.

10 Claims, 6 Drawing Sheets

(56) References Cited

U.S. PATENT DOCUMENTS

| | | |
|---|---|---|
| 8,714,768 B2 | 5/2014 | Tittle |
| 2011/0017256 A1 | 1/2011 | Stevens |
| 2011/0154774 A1* | 6/2011 | Rawlings ............... F24J 2/5235 52/745.21 |
| 2011/0253193 A1* | 10/2011 | Korman .................... F24J 2/36 136/245 |
| 2012/0143383 A1 | 6/2012 | Cooperrider et al. |

FOREIGN PATENT DOCUMENTS

| | | |
|---|---|---|
| EP | 2262002 A2 | 12/2010 |
| EP | 2431546 A1 | 3/2012 |
| EP | 2508792 A1 | 4/2014 |
| RU | 2226731 C1 | 4/2004 |
| WO | 2008125711 A1 | 10/2008 |
| WO | 2009039247 A1 | 3/2009 |

\* cited by examiner

SYSTEM OF SOLAR MODULES CONFIGURED FOR ATTACHMENT TO VERTICAL STRUCTURES

CROSS-REFERENCE TO RELATED APPLICATIONS

This application claims the priority benefit of U.S. Provisional Application 61/934,164 filed Jan. 31, 2014, which is herein incorporated by reference in its entirety.

TECHNICAL FIELD

This disclosure is related to solar powered systems. More particularly, the disclosure discusses systems and methods for attaching and enabling solar modules using vertical structures.

BACKGROUND

The statements in this section merely provide background information related to the present disclosure. Accordingly, such statements are not intended to constitute an admission of prior art.

There is a huge market for solar powered lighting systems, especially using high efficiency solid state lighting that reduces the power demand of luminaires. Alternative means of generating on-site renewable power from solar photovoltaic (PV) technology has made this a feasible alternative to grid supplied power for external lighting, such as on roads, in parks, on pathways and in parking lots. In response to this new opportunity for alternative solar power, numerous designs of PV panels and their means of support have been devised, with the current standard being the utilization of large flat panels oriented towards the sun with a zenith angle relative to the vertical earth axis, in a south facing direction (in the northern hemisphere), where the zenith angle is set to an optimal tilt angle that maximizes total annual solar energy produced, as a function of earth's latitude at the location being applied.

BRIEF SUMMARY OF THE INVENTION

In one embodiment, the system of solar modules configured for attachment to a vertical pole comprise: a plurality of PV strips; a plurality of frames, which are cross-sectional extrusions that enable concealed fixtures for the attachment of cleats or hinges, wherein each frame holds a side of one of the PV strips; a plurality of semi-rigid channel bending flex cleats or hinges, wherein each cleat or hinge is affixed to two adjacent frames; a plurality of tube blocks, wherein each tube block is affixed to one frame and two tube blocks are affixed to a single bending flex cleat or hinge; a plurality of fasteners, wherein each fastener secures a tube block to a matching bending flex cleat or hinge and a matching frame, a plurality of hanger clips that attach to U hanger brackets, and a plurality of flexible strips which are affixed to the U hanger brackets.

In a separate embodiment, the system cited above, wherein each U hanger bracket is configured to attach to two frames of the plurality of PV strips; further wherein each U hanger bracket is affixed to the frames with a plurality of fasteners.

In a separate embodiment, the flexible strip provides an elastic support layer between the U hanger brackets and the column surface.

In a separate embodiment, the system further comprises: a closer cleat configured to secure two ends of a plurality of PV strips; a strap which is tightened around the pole; and a strap fastener tensioned around the pole and used to secure the strap to the aluminum frames.

In a separate embodiment, the system further comprises: a plurality of hanger clips affixed to a strap fastener, configured to support and attach to a plurality of U hanger brackets that vertically support the PV strips in the formation of an entire module. The hanger clips provide the primary vertical support connection between the strap fastener and the U hanger brackets which in turn support the PV strips.

The PV strips can comprise high efficiency rigid crystalline silicon technology or any other solar cell technology. This is because the PV strips do not have to be bent. Hence any PV technology which requires rigidity can be used, although this feature is non-limiting (i.e. flexible PV strips can also be used).

The frame material of construction can be aluminum or the like. The frames can have a combined monolithic internal c-shaped and external c-shaped embodiment which is configured to hold a rectangular-shaped element in both the internal and external portions of the frame. In one embodiment, the internal c-shape holds one end of a PV strip while the external c-shape holds a tube block.

The flexible strips can be a synthetic polymer or the like, with sufficient rigidity to transfer the circumferential pressure from the tensioned strap such that it does not excessively compress under strap tension load and other imposed load, nor excessively shear under PV panel self-weight and other imposed load, yet sufficiently flexible to allow for some precompression and relaxation to accommodate out of tolerance between framing elements and the column dimension. The flexible strips can have, for example, an elastic compressive stiffness of 9 lbs/in$^2$ at 25% deflection.

The semi-rigid bending cleats can have for example a bending stiffness of 10 lbs·in$^2$ in the particular embodiment. In a separate embodiment, the hinges can have a torsional stiffness of 10 lbs·in$^2$.

The tube block material of construction can be aluminum, plastic, or the like. In a separate embodiment, the hinges material of construction can be aluminum, plastic, or the like. The fastener can be a screw, rivet, nail, weld, or the like.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

DETAILED DESCRIPTION

Figure 1:
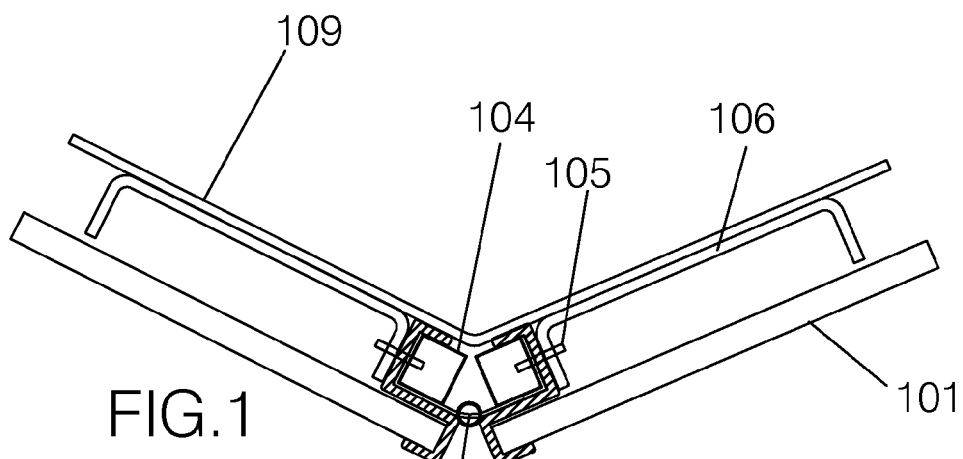
FIG. 1 shows a connector detail in a rotated strip arrangement.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In preference to the standard method of capturing solar energy, this invention adopts a strategy that locates solar photovoltaic strips vertically and wraps articulated strips around the entire light pole circumference over most of the height of the pole. This vertical slim line multi-strip wrapped arrangement forms a complete connected and articulated module that provides advantages over the single flat tilted angle panel systems, since it avoids dirt buildup on the surface; provides an aerodynamic profile hence reducing wind loads on the column; offers omnidirectional solar capture that more uniformly captures solar energy across all seasons without being latitude dependent and maximizes capturing diffused solar energy around 360 degrees at all times of the day; and avoids snow buildup and hence eliminates snow loads as well as eliminates snow obscuring available solar capture. The articulated strips can be configured to fit to any size and cross section shape of pole by adjusting strip attachment hinges, to create configurations to suit each particular pole size, that can easily be customized using adjustable assembly procedures that permit retro-fitting poles as well as constructing new systems. This method of attachment permits flat-pack shipping of assembled modules and on-site articulation of the joints to allow the module to be flexed into shape around the pole and to be easily connected to a pole with a concealed attachment. The disclosure herein enables an efficient manufacturing method, which facilitates the means of packaging in optimal flat pack arrangements for ease of handling and transportation, as well the means for site erection, owing to the unique functionality of the articulated jointing system that facilitates articulated strip wrapping modular assembly from flat packaged assembly, transportation and handling and permitting articulation of the joints to allow the module to be erected and connected to the pole with a concealed attachment. The articulated, connections ensure that the final articular strips can be fitted to a profile that closely matches the pole size with adequate fit up tolerances, and which is also consistent with the slim line profile of the lamp pole. This tight fitting profile minimizes aerodynamic drag on the pole and emphasizes its slender appearance, which also provides a beneficial aesthetic that aligns with the shape of the pole and as such is not visually distracting.

The present disclosure accommodates the required engineering configurations of customized solar cell stringing together with parallel and series electrical connections which are essential to ensuring that the total characteristics of the electrical system match particular solar lighting applications. Examples of such configurations include a grid connected system that requires AC power output, or an autonomous off grid system that requires DC power output, and a wide range of possible luminaires as required by specific applications related to power output, lumen output, and type of light distribution. The configuration of the PV cell arrangement is entirely dependent on these kinds of electrical characteristic demands and as such are customized for each installation, requiring particular specifications for voltage and amperage to be for each of these variations. As such, these arrangements permit a modular approach to be adopted which permits mass customized modular units that in turn allows the method of manufacture to be standardized, yet is flexible enough to accommodate custom variations without needing to alter the entire assembly methodology.

Although this disclosure mostly discusses the application of solar photovoltaic panels on vertically-oriented circular, square, or rectangular street light poles, those versed in the state of the art will be able to utilize the disclosure in a wide range of other vertically- and horizontally-oriented applications where articulated, panelized and modular jointing system with concealed attachments would be beneficial. Further non-limiting examples include towers, poles, posts, columns, pillars, piers, monuments, beams, planks, joists, tubular lengths, cross-sections and other vertically- or horizontally-oriented artifices used for: mobile/cellular, wi-fi/internet, video surveillance, traffic signaling, signage and wayfinding, advertising, artists' installations, and building-integrated photovoltaic (BIPV) installations.

The system and method described herein enable the use of high efficiency rigid crystalline silicon technology, as well as any other solar cell technology, to allow minimal profile shapes of solar PV panels to be installed on the pole and to maximize total power output for the given area. In contrast, competing systems require the use of wrapped flexible thin film solar technology, which captures about half of the solar PV output of rigid crystalline technology. Other competing systems that use crystalline solar cells are bent into a circular shape to form a cassette that is part of a vertical pole, however such configurations are expected to be unreliable due to the potential for micro-cracking fracture of the cells due to bending and there is a limit on the number of cassettes that can be stacked vertically, placing strict vertical height limitations on its application. Other configurations place flat solar cells within a cylindrical enclosure that reduces the amount of available solar capture area and raises concerns about the buildup of condensation within the cylinder and associated limitations on the number of enclosures that can be stacked vertically, also placing strict vertical height limitations on application. Hence, the described system and method permit a much higher total hourly, daily, and annual solar PV power output and can power much higher lamp wattages compared to other existing systems.

The present disclosure enables the use of high efficiency rigid crystalline PV solar cell technology, or any other solar cell technology, whereby planar surfaces are used in prismatic configurations such as triangle, square, rectangle, pentangle, hexagon, heptagon, octagon or any type of n-gon polygon cross section shaped pole, where n is any number that forms the necessary planar faces to match a variety of cross sectional pole shapes. The disclosure allows any n-gon rigid framed solar strip array to be wrapped around a pole in a single monolithically connected, articulated solar module, by making allowances in the jointing system to permit manufacture as a flat module as well as to be erected into a prismatic closed geometry. This disclosure avoids the expense and labor intensity required to fix separate individual panels to the column in the field.

The system enables application to any column cross-sections using the same fixing system discussed above. That is, this method of fixing can be accomplished on completely circular columns or square or rectangular columns, and as such is not restricted to prismatic pole profiles. In effect, the methods can be applied to any tessellated cross-sectional configuration comprising a plurality of faceted panel strips that approximately match any given pole shape, and still retain aerodynamic profile advantages.

The vertical orientation of the PV strips requires a fixture system that securely connects the module to the sheer vertical surface of a pole, in such a way that does not require penetrations into the pole, nor visually distracts from the overall slender-form appearance of the pole. The system achieves this by concealing the fixtures behind the modules. This fixturing system is comprised of a combination of hangers attached to a strap that is tensioned against the column with a set force that permits the weight of a module to be supported in friction between the strap and the column. The size and shape of this system has been designed to avoid breakage of the strap due to over tensioning. The tension force is a function of strap material and size, as well as the column material surface friction properties and the total weight of the modular strip system to be carried by the strap in vertical shear friction, for example in the particular embodiment, the optimal ratio between strap tension and module weight is a factor of 12. This disclosure uses the pre-stressing concept to create vertical friction force resistance which holds the module in place, hence avoiding additional shear connectors between the module and the pole.

The disclosure describes a method of attachment between respective PV strip panels to form a semi-rigid, articulated module that may be bent into curved shapes from an original flat modular assembly configuration. Each module is of a fixed height (typically 3 feet to allow for ease of manufacture, handling, and erection) but variable lengths to suit each column size and shape application. The modules are customized in size and electrical performance, which are fixed sequentially onto the pole, vertically one above the other, ensuring electrical interconnectivity to form a system or number of PV modules which provide the required power output for the particular solar lighting application. The number of modules on a given pole are directly related to the size of battery power storage, the specific pole height, and the lamp power load. The PV strips are fitted with a specially designed edge frame that is prefabricated to a particular custom sized profile and which functions both as edge frame to enclose and protect the PV strip edges, and as a base support for the interconnecting cleats between PV panel strips. The frame is dimensioned to provide a nested type of channel to accommodate the hinged cleat (as described by number on the drawings) that ensures a mechanical advantage between the frame and cleat. Once the individual strips are connected together, the electrical junctions between PV strips are also maintained through a flexible wire that permits the entire module to be flexed to form an electrically continuous and connected annular shape, through the flexible function of the joints. Therefore both the mechanical and electrical dimensions, flex properties, and bending tolerances are consistently integrated to permit application to the various pole cross-section shape dimensions, without distressing the materials that pass through the joint, and yet balancing flexibility and rigidity to accomplish a flat panel that can be bent into a new shape and still retain its necessary properties for transportation, handling, final erection, and attachment.

The disclosure describes the use of a semi rigid interconnected flex cleat or hinge system, that is devised to articulate between each cell strip, and which allows the strips to be connected to each other and assembled into a complete monolithically connected module that is then bent through the semi-rigid connection to create a curved overall form which permits easy fixing to a pole in one complete operation. The cleats permit both connectivity during manufacture and in the final form of post fitting to the pole. Since this fixture serves multiple functions during manufacture, handling and erection, it provides overall advantages for the modular panel on a number of levels. A bent plate channel configuration that forms the flex cleat or hinge is devised, that snugly fits into a matching channel geometry of the cell strips' surrounding frame. This permits the channel to encompass the flex cleat or hinge attachment with a simple fastener (e.g. screw, weld, rivet, or cinch) attachment, whose shape is maintained by a block insert, which also acts as an anchor attachment to the flex cleat or hinge via a fastener, allowing matching geometries to provide the mechanical advantage in friction, avoiding multiple fixtures. The cleat or hinge component is sized to have an optimal stiffness, to maintain an integral semi-rigid articulated module during manufacture and handling, as well as to permit permanent bending of the cleat or hinge to form the module into a bent shape which can be wrapped around and fitted to various column geometry variations, without needing to add fixtures to maintain its shape. This method of fixing also maintains an interconnected tension strapping mechanism that attaches to the pole by pre-stressing the entire module along the flex cleat or hinge attachment line, to ensure that sufficient friction resistance is achieved between the cell strip frame and the column which it is attached to. The permanently deformed flex cleat or hinge attachment provides sufficient flexibility to allow the module to be deformed into the appropriate circular or rectangular column geometry, while still maintaining sufficient stiffness during service conditions after it becomes attached to the pole. A series of analytical studies and prototyping validation trials were necessary to discover the appropriate stiffness required for the channel cleat or hinge material and size.

An intermediate flexible strip is attached between the modular framed PV strips and the pole to provide damping against vibration and shock loads as well as serving as a flexible layer that compensates for differences in fit up dimensions arising from manufacturing tolerances. The disclosure provides for a flexible strip of defined thickness, width and elastic modulus that is fitted between the modular strip system, along the line of the articulated attachment flex cleats and the pole, to both uniformly transfer load between the module and the pole and to provide a damping medium that avoids vibration, shock and rattling between module and pole under wind conditions. Since the pre-stress force has to be sufficient to ensure mechanical connection through friction between module and pole, this force has to be transferred to ensure this mechanical requirement. As such the flexible strip is dimensionally coordinated with the overall fixing system and is provided with a sufficient modulus of elasticity to allow the module to close at the attachment points without too much resistance yet maintain the pre-stress force by being stiff enough to create the mechanical friction interlock to ensure that the module remains attached to the pole. A series of analytical studies and prototyping validation trials were necessary to discover the appropriate stiffness required for the flexible strip material and size.

Variances in PV cell configuration design, tuned to specific application: The disclosure describes the assembly of a number of customized sizes to meet various electrical specifications that suit particular pole sizes, shapes and lighting demand applications. The ability of the modular sizes is facilitated through the unique functionality of the concealed flexible cleat design that permits any size and shape to be fitted without redesign of the strip assembly arrangement nor requiring any reconfiguration of the system for manufacture, handling, transportation and erection. Although the overall final module might vary in width to accommodate various pole cross section shape geometries, its height is generally maintained to be fixed for the particular application and production run, which is made possible by the unique fixture attachment, integrated geometry and mechanical function as a semi rigid attachment that is multifunctional. This permits the function of the PV cell electrical specification, and the PV cell physical layout and interconnectivity, to be customized for any particular application, without altering the basic manufacturing and system assembly.

Technical complexity of the system design: The combined integrated functionality of the PV strips and module assembly is described in the drawings—this describes the system in detail, yet retains the generality of its application to multiple types of geometry, PV strip hinging configuration and electrical specification. The system is not particular to any one pole size and cross section, nor particular to any one hinging system between PV strips, nor particular to any one lighting electrical demand requirement. The system is highly versatile towards being able to be customized for any pole size and shape as well as electrical demand. As such the interconnectedness of the system design describes a function of high technical complexity that has been evolved over a series of analytical and prototyping trials to ensure adequate joint sizing and articulation for facilitating its role during manufacture, assembly, handling, transporting and erection with suitable allowance for tolerances to match various pole cross section geometries and attachment to the underlying pole surface.

A flex hinge system concept that integrates all the requirements of manufacture, delivery, and installation fixturing in a single component: As described above, the flex cleat or hinge function was invented to create a semi-rigid hinge system to allow various functions to be catered for. These are: same method of assembly for different custom sizes of PV strips; permits unit modules to be manufactured that can be easily manhandled during all stages of manufacture, packaging and erection; adequate rigidity of interconnecting joints to permit ease of handling of an articulated system that possess sufficient stiffness within the hinge mechanism that avoids potentially awkward actions to move, stack and store the modular units; adequate rigidity of interconnecting joints to ensure flat packaging to create compact boxed units that are light enough to be manhandled without any waste of space; adequate rigidity to hold in temporary position during on-site or post-fix attachment to poles already erected on site; sufficient flexibility to permit the strips to be bent at the point of assembly, without the need for any mechanical devices, which can easily be accomplished by one operative; sufficient rigidity to transfer tensile forces that clamp the module to the pole, forming a secure vertical connection attachment to the pole to adequately sustain resistance forces against loads from self-weight and wind loads; and permit ease of access for later removal or replacement as necessary.

FIG. 1 shows a connector hinge detail in a rotated panel arrangement. Shown are connector hinge 100, PV strips 101, aluminum frames 102, semi-rigid flex cleat 103, close fit block 104, fastener 105, hanger bracket 106, and flexible strip 109.

Figure 2:
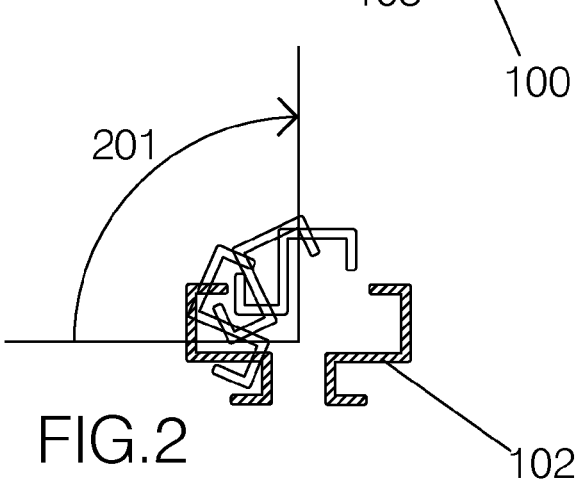
FIG. 2 shows connector articulation during a bending process.

FIG. 2 shows connector hinge articulation during a bending process. Shown are two matching aluminum frames 102 which rotate in relation to each other. The angle of rotation 201 is dependent upon the installation requirements. For example, installation on a rectangular pole would require a 90 degree angle of rotation. Installation on a circular pole requires an angle of rotation 201 which is a function of the pole diameter and PV strip width.

Figure 3:
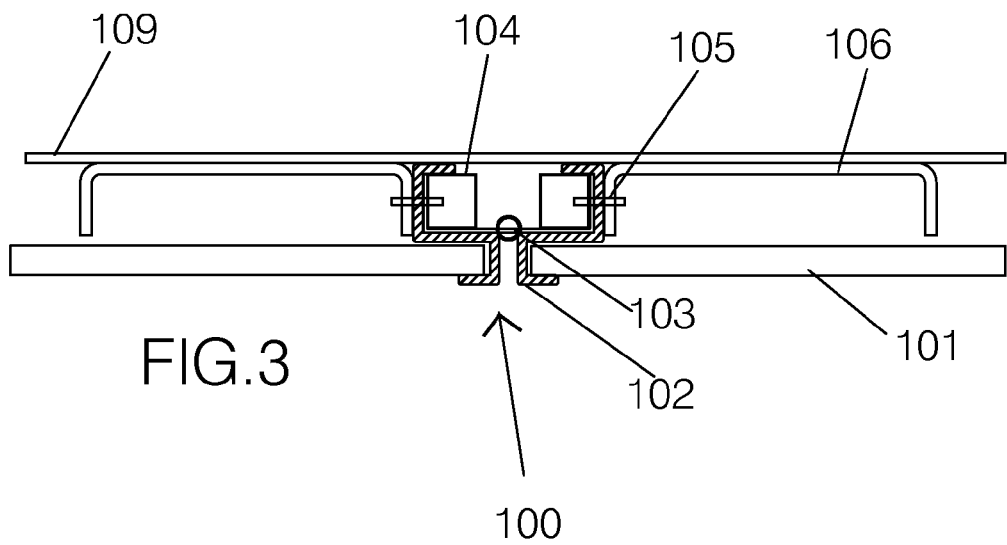
FIG. 3 shows connector detail in a flat strip arrangement.

FIG. 3 shows a connector hinge detail in a flat module arrangement. Shown are connector hinge 100, PV strips 101, aluminum frames 102, semi-rigid flex cleat 103, close fit block 104, and fastener 105, hanger bracket 106, and flexible strips 109.

Figure 4:
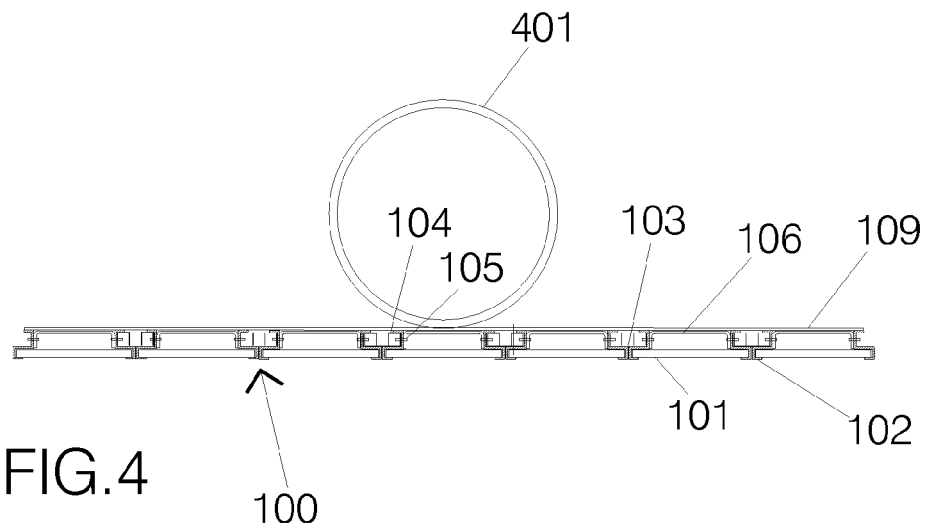
FIG. 4 shows modular wrapping method stages for circular cross-section columns, stage 1: flat module manufacture.

FIG. 4 shows modular wrapping method stages circular cross-section columns, stage 1: flat module manufacture. Shown are the cross-section of a circular pole 401, connector hinge 100, PV strips 101, aluminum frames 102, semi-rigid flex cleat 103, close fit block 104, fastener 105, hanger bracket 106, and flexible strip 109.

Figure 5:
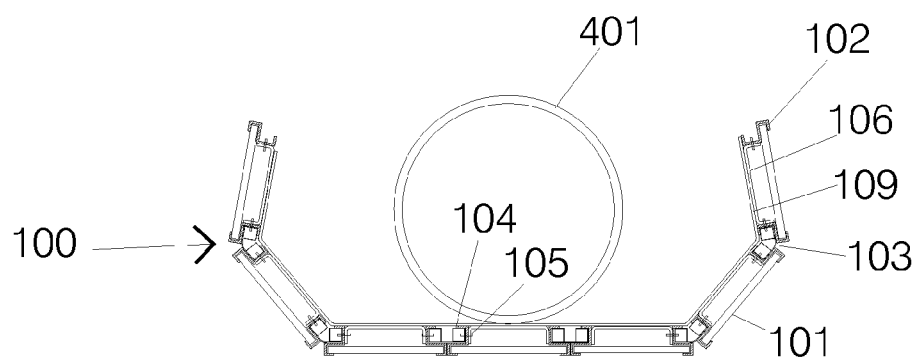
FIG. 5 shows modular wrapping method stages for circular cross-section columns, stage 2: intermediate wrapping action.

FIG. 5 shows modular wrapping method stages circular cross-section columns, stage 2: intermediate wrapping action. Shown are the cross-section of a circular pole 401, connector hinge 100, PV strips 101, aluminum frames 102, semi-rigid flex cleat 103, close fit block 104, fastener 105, hanger bracket 106, and flexible strip 109.

Figure 6:
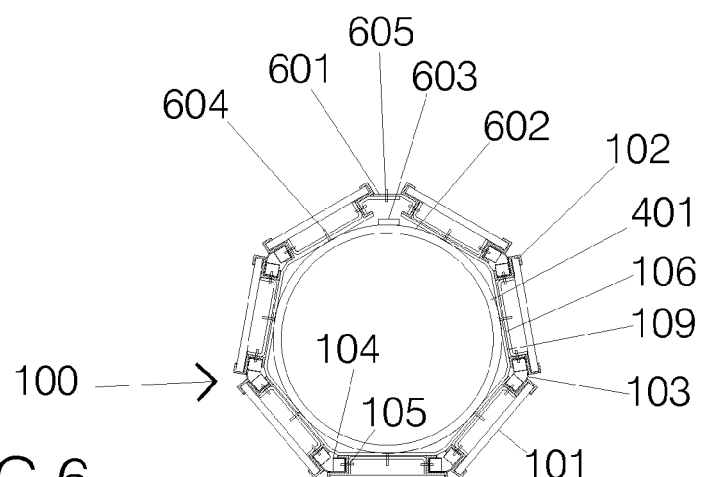
FIG. 6 shows modular wrapping method stages for circular cross-section columns, stage 3: fully wrapped and attached to column.

FIG. 6 shows modular wrapping method stages circular cross-section columns, stage 3: fully wrapped and attached to column. Shown are the cross-section of a circular pole 401, connector hinge 100, PV strips 101, aluminum frames 102, semi-rigid flex cleat 103, close fit block 104, fastener 105, hanger bracket 106, closer cleat 601, closer fastener 605, stainless steel strap 602 which is tightened around the pole 401, and strap fastener 603 tensioned around the pole 401 and used to secure the stainless steel strap 602 and a hanger clip 604 to the hanger bracket 106 and flexible strip 109.

Figure 7:
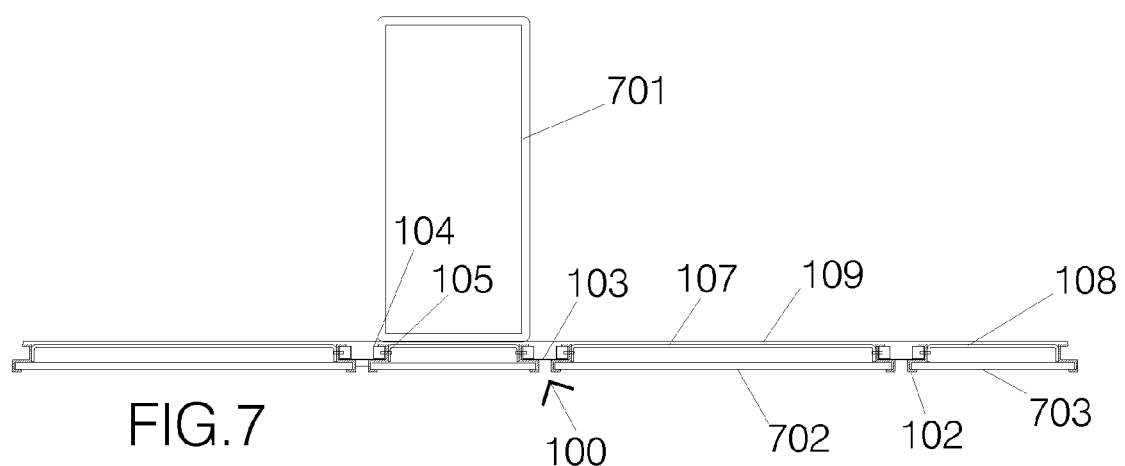
FIG. 7 shows a modular wrapping method stage for rectangular cross-section columns, stage 1: flat module manufacture.

FIG. 7 shows a modular wrapping method stage for rectangular cross-section columns, stage 1: flat module manufacture. Shown are the cross-section of a rectangular pole 701, connector hinge 100, wide PV strips 702 and narrow PV strips 703, aluminum frames 102, semi-rigid flex cleat 103, close fit block 104, fastener 105 and flexible strip 109.

Figure 8:
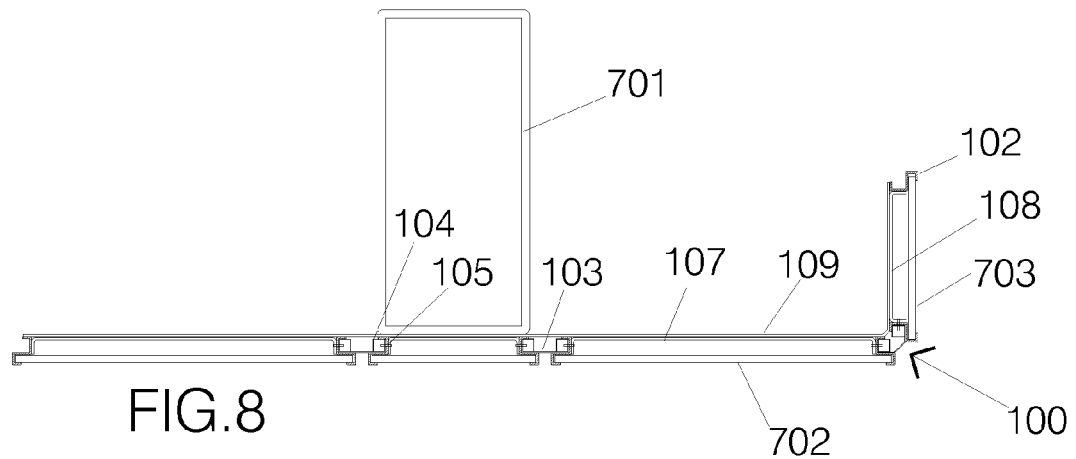
FIG. 8 shows a modular wrapping method stage for rectangular cross-section columns, stage 2: intermediate wrapping action.

FIG. 8 shows a modular wrapping method stage for rectangular cross-section columns, stage 2: intermediate wrapping action. Shown are the cross-section of a rectangular pole 701, connector hinge 100, wide PV strips 702 and narrow PV strips 703, aluminum frames 102, semi-rigid flex cleat 103, wide hanger bracket 107, narrow hanger bracket 108, close fit block 104, fastener 105 and flexible strip 109.

Figure 9:
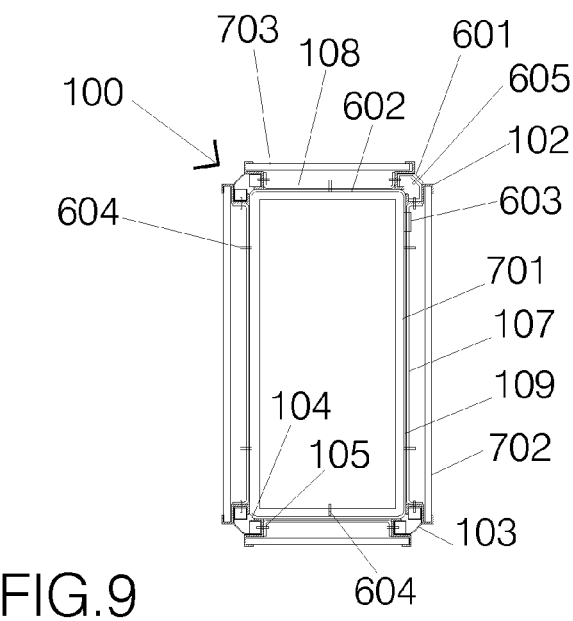
FIG. 9 shows a modular wrapping method stage for rectangular cross-section columns, stage 3: fully wrapped and attached to column.

FIG. 9 shows a modular wrapping method stage for rectangular cross-section columns, stage 3: fully wrapped and attached to column. Shown are the cross-section of a rectangular pole 701, connector hinge 100, wide PV panel strips 702 and narrow PV strips 703, aluminum frames 102, semi-rigid flex cleat 103, wide hanger bracket 107, narrow hanger bracket 108, close fit block 104, fastener 105, closer cleat 601, closer fastener 605, stainless steel strap 602 which is tightened around the pole 401, and strap fastener 603 tensioned around the pole 401 and used to secure the stainless steel strap 602 and a hanger clip 604 to wide hanger bracket 107 and narrow hanger bracket 108 and flexible strips 109.

Figure 10:
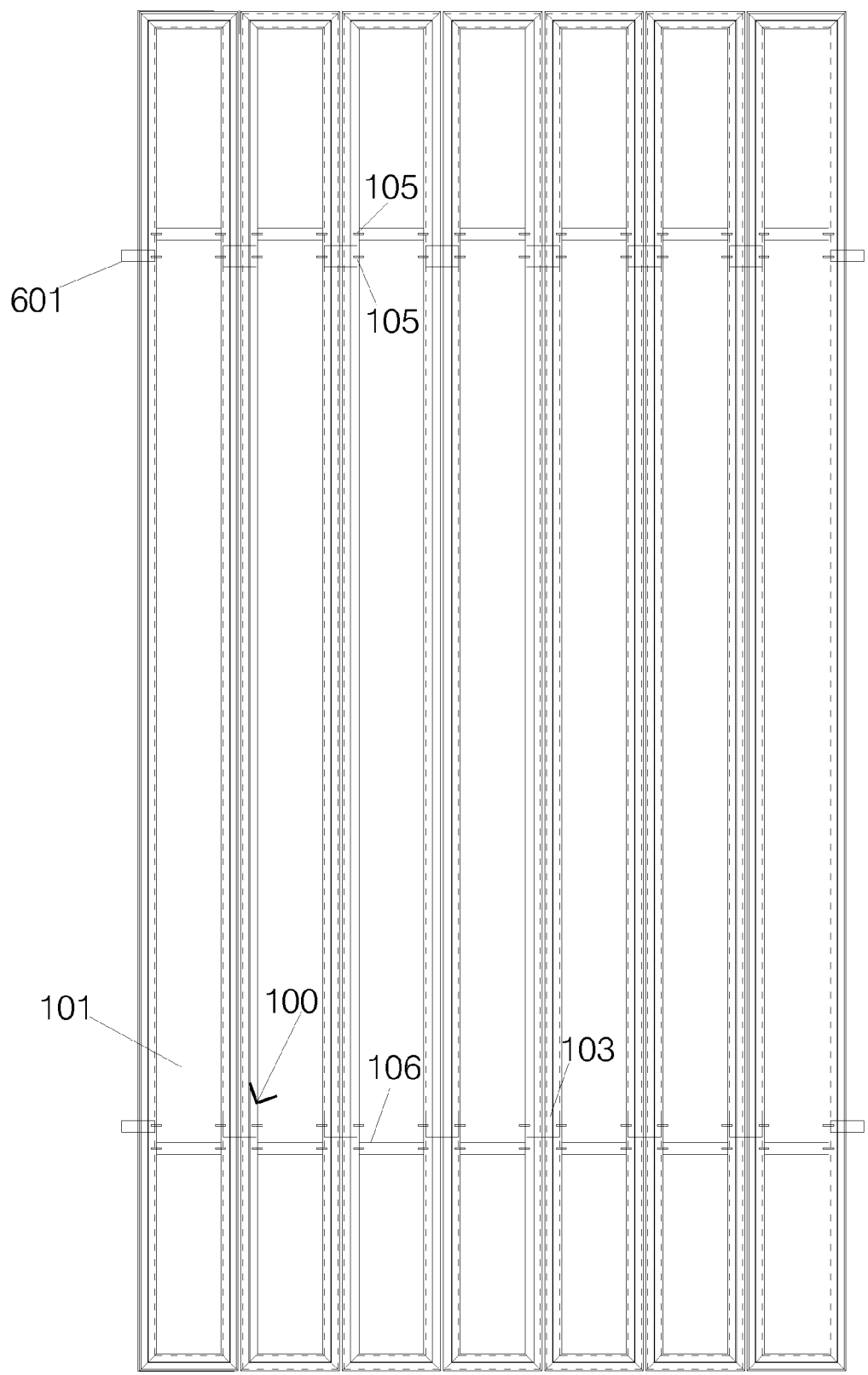
FIG. 10 shows a front view of PV strips assembled module for circular columns.

FIG. 10 shows a front-view of PV strips assembled module for circular columns. Shown are connector hinge 100, hanger bracket 106, PV strips 101, closer cleat 601, fastener 105, and semi-rigid flex cleat 103.

Figure 11:
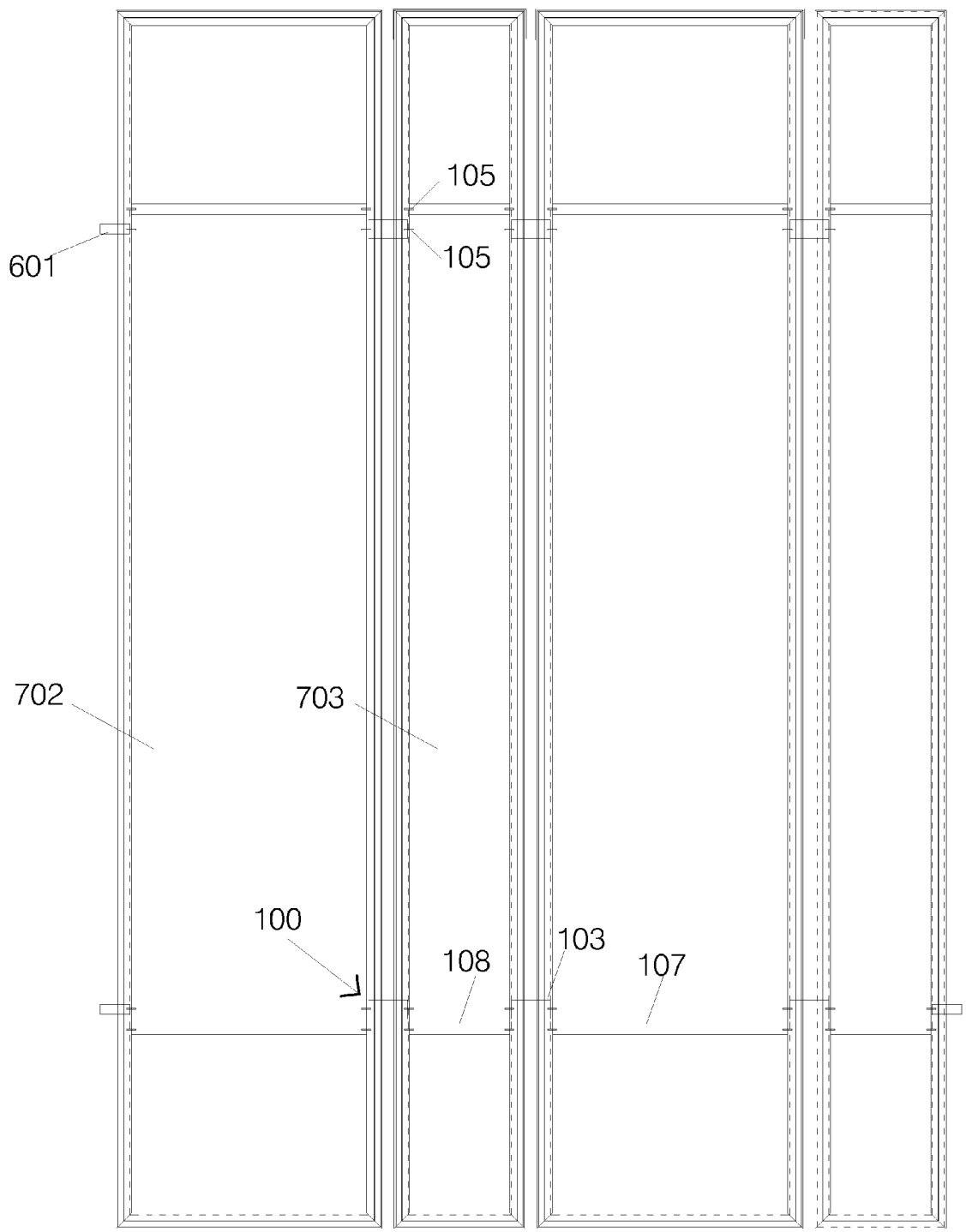
FIG. 11 shows a front view of PV strips assembled module for rectangular columns.

FIG. 11 shows a front-view of PV strips assembled module for rectangular columns. Shown are connector hinge 100, to wide hanger bracket 107 and narrow hanger bracket 108, wide PV strips 702, narrow PV strips 703, closer cleat 601, fastener 105, and semi-rigid flex cleat 103.

Figure 12:
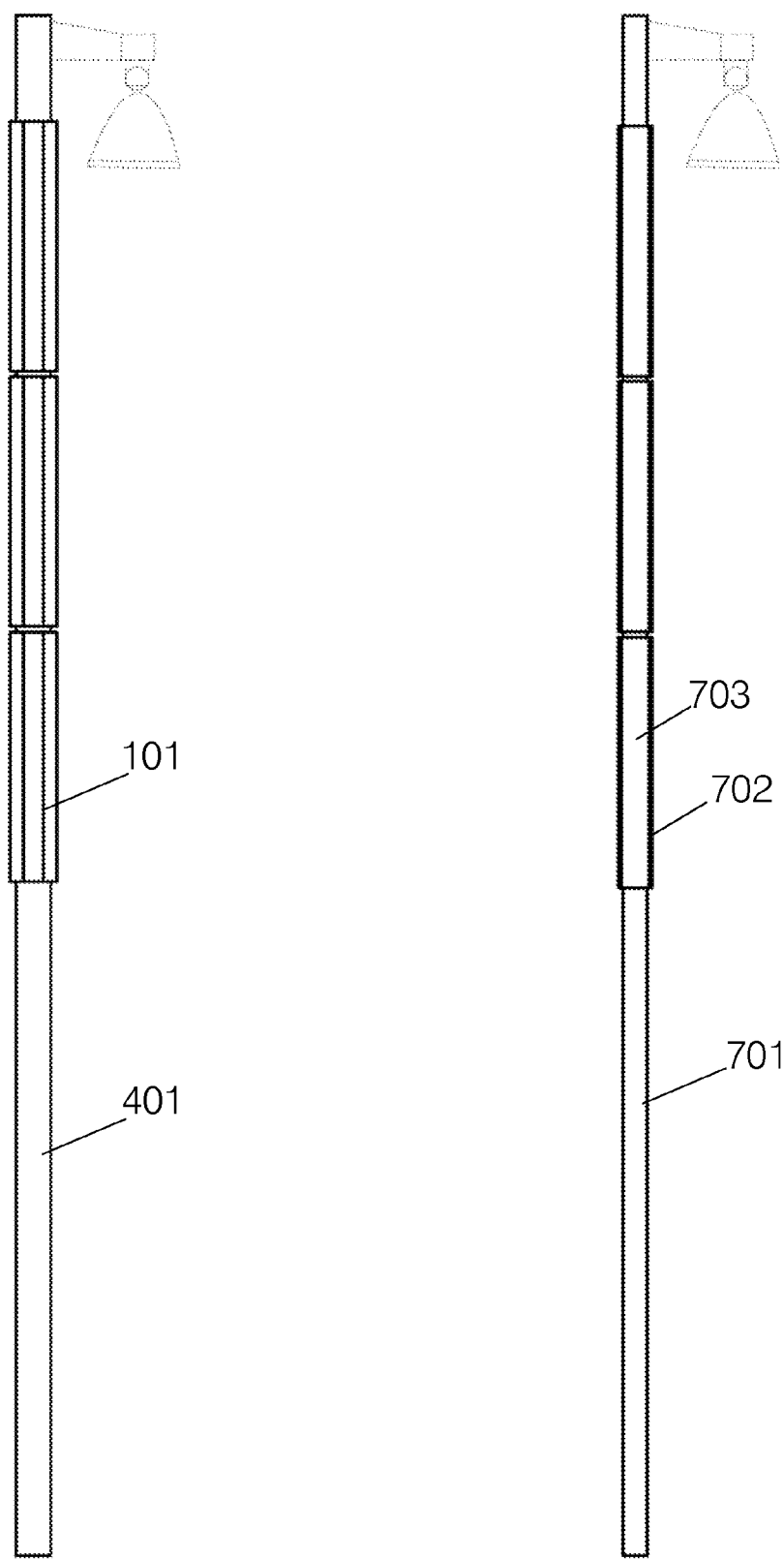
FIG. 12 shows example elevations view of PV strips assembled into modules affixed to a lamp pole.

FIG. 12 shows example elevations view of PV strips assembled into modules affixed to a lamp pole. Shown are the circular pole 401, rectangular pole 701, PV strips 101 for circular pole, narrow PV strips 703 and wide PV strips 702 for rectangular pole.

All patents and publications mentioned in the prior art are indicative of the levels of those skilled in the art to which the invention pertains. All patents and publications are herein incorporated by reference to the same extent as if each individual publication was specifically and individually indicated to be incorporated by reference, to the extent that they do not conflict with this disclosure.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

I claim:

1. A system configured for attachment to a vertical structure, the system comprising:
    a plurality of photovoltaic strips;
    a plurality of frames, which are cross-extrusions that enable concealed fixtures for attachment of bending flex cleats or hinges, wherein each frame holds a side of one of the photovoltaic strips;
    a plurality of semi-rigid channel bending flex cleats or hinges, wherein each cleat or hinge is affixed to two adjacent frames;
    a plurality of tube blocks, wherein each tube block is affixed to one frame and two tube blocks are affixed to a single bending flex cleat or hinge;
    a plurality of fasteners, wherein each fastener secures a tube block to a matching bending flex cleat or hinge and a matching frame;
    a plurality of U hanger brackets that are affixed to the plurality of frames; and
    a plurality of flexible strips that are affixed to the U hanger brackets.

2. The system of claim 1, further comprising: a closer cleat configured to secure two ends of plurality of photovoltaic strips through a closer fastener.

3. The system of claim 1, wherein the photovoltaic strips comprise high efficiency rigid crystalline silicon cells.

4. The system of claim 1, wherein the frames have a combined monolithic internal c-shape and external c-shaped which is configured to hold a rectangular-shaped element in both the internal and external portions of the frame.

5. The system of claim 1, wherein the flexible strips comprise materials having approximately an elastic compressive stiffness of 9 lbs/in$^2$ at 25% deflection.

6. The system of claim 1, wherein the cleats can have an elastic bending stiffness of approximately 10 lbs/in$^2$.

7. The system of claim 1, wherein the flexible strips provide an elastic support layer between the U hanger brackets and a surface of the vertical structure.

8. The system of claim 7, further comprising a strap configured to be tightened around the vertical structure and a strap fastener tensioned around the vertical structure and used to secure the strap to the vertical structure.

9. The system of claim 7, further comprising: a plurality of hanger clips affixed to the strap, configured to support and attach to the plurality of U hanger brackets that vertically support the photovoltaic strips in the formation of a module, wherein the hanger clips provide a vertical support connection between the strap fastener and the U hanger brackets which in turn support the photovoltaic strips.

10. A method utilizing the system of claim 1, the method comprising:
    connecting a strap to a plurality of hanger clips to form a strap assembly;
    attaching the strap assembly around a vertical structure;
    tensioning the strap assembly against the structure;
    connecting two ends of the strap to strap fasteners;
    applying a flexible strip to the U hanger brackets of the system;
    wrapping the system around the vertical structure in a position above the strap assembly; and
    lowering the system in relation to the vertical structure so that the system rests upon the plurality of hanger clips and the flexible strip.

\* \* \* \* \*